(12) United States Patent
Wustman et al.

(10) Patent No.: US 7,270,764 B2
(45) Date of Patent: Sep. 18, 2007

(54) METHOD FOR REMOVING ALUMINIDE COATING FROM METAL SUBSTRATE AND TURBINE ENGINE PART SO TREATED

(75) Inventors: Roger Dale Wustman, Mason, OH (US); Mark Alan Rosenzweig, Hamilton, OH (US); William Clarke Brooks, Lebanon, OH (US); Brian H. Pilsner, Mason, OH (US); James Douglas Risbeck, Cincinnati, OH (US); Richard Roy Worthing, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 11/171,686

(22) Filed: Jun. 30, 2005

(65) Prior Publication Data

US 2005/0244274 A1 Nov. 3, 2005

Related U.S. Application Data

(62) Division of application No. 10/339,475, filed on Jan. 9, 2003, now Pat. No. 7,008,553.

(51) Int. Cl.
*B44C 1/22* (2006.01)
*C03C 15/00* (2006.01)
*C03C 25/68* (2006.01)
*C23F 1/00* (2006.01)
*B23P 6/00* (2006.01)

(52) U.S. Cl. .................. 216/108; 29/889.1; 134/41
(58) Field of Classification Search ................ 216/103, 216/108, 41; 134/3, 41; 29/889.1
See application file for complete search history.

(56) References Cited

U.S. PATENT DOCUMENTS

| | | | |
|---|---|---|---|
| 3,622,391 A | 11/1971 | Baldi | |
| 3,833,414 A | 9/1974 | Grisik et al. | |
| 4,116,723 A | 9/1978 | Gell et al. | |
| 4,176,433 A | 12/1979 | Lee et al. | |
| 4,282,041 A | 8/1981 | Cork | |
| 4,425,185 A | 1/1984 | Fishter et al. | |
| 4,486,245 A * | 12/1984 | Chigasaki et al. | 148/503 |
| 4,965,095 A | 10/1990 | Baldi | |
| 4,977,036 A | 12/1990 | Baldi | |
| 4,978,558 A * | 12/1990 | Lamm | 427/250 |
| 5,399,313 A | 3/1995 | Ross et al. | |
| 5,464,479 A | 11/1995 | Kenton et al. | |
| 5,705,082 A | 1/1998 | Hinson | |
| 5,813,118 A | 9/1998 | Roedl et al. | |
| 5,928,725 A * | 7/1999 | Howard et al. | 427/237 |
| 5,944,909 A | 8/1999 | Reeves et al. | |
| 5,976,265 A | 11/1999 | Sangeeta et al. | |
| 6,174,380 B1 | 1/2001 | Rosenzweig et al. | |
| 6,183,811 B1 * | 2/2001 | Conner | 427/250 |
| 6,267,902 B1 | 7/2001 | Cartier et al. | |
| 6,328,810 B1 | 12/2001 | Conner et al. | |
| 6,355,116 B1 | 3/2002 | Chen et al. | |
| 2002/0100493 A1 | 8/2002 | Kool et al. | |

FOREIGN PATENT DOCUMENTS

| EP | 1 136 593 A | 9/2001 |
|---|---|---|
| GB | 1 525 322 A | 9/1978 |
| GB | 1 565 107 A | 6/1980 |

* cited by examiner

*Primary Examiner*—Roberts Culbert
(74) *Attorney, Agent, or Firm*—Donald E. Hasse; Daniel F. Nesbitt; Hasse & Nesbitt LLC

(57) ABSTRACT

A method for selectively removing an aluminide coating from at least one surface of a metal-based substrate by: (a) contacting the surface of the substrate with at least one stripping composition comprising nitric acid at a temperature less than about 20° C. to degrade the coating without damaging the substrate; and (b) removing the degraded coating without damaging the substrate. Also disclosed is a method for replacing a worn or damaged aluminide coating on at least one surface of a metal-based substrate by selectively removing the coating using the above steps, and then applying a new aluminide coating to the surface of the substrate. Turbine engine parts, such as high-pressure turbine blades, treated using the above methods are also disclosed.

20 Claims, No Drawings

METHOD FOR REMOVING ALUMINIDE COATING FROM METAL SUBSTRATE AND TURBINE ENGINE PART SO TREATED

CROSS-REFERENCE TO RELATED APPLICATIONS

This application is a divisional of U.S. patent application Ser. No. 10/339,475, filed on Jan. 9, 2003 now U.S. Pat. No. 7,008,553, incorporated herein by reference.

BACKGROUND OF THE INVENTION

This invention relates to a method for removing an aluminide coating from a metal-based substrate. More particularly, the invention is directed to a method for selectively removing an aluminide coating by using a stripping composition to degrade the coating and then removing it without damaging the substrate. The invention also relates to a turbine engine part having an aluminide coating, at least a portion of which has been selectively removed by the above method.

A variety of coatings are often used to protect metal parts exposed to high temperatures, such as parts made from superalloys. For example, gas turbine engine components (and other industrial parts) are often formed of superalloys that can withstand a variety of extreme operating conditions. Such parts are usually covered with coatings to protect them from environmental degradation, including the adverse effects of corrosion and oxidation. Coatings used on components in gas turbine hot sections, such as blades, nozzles, combustors, turbine shrouds and transition pieces, generally belong to one of two classes: diffusion coatings or overlay coatings.

Diffusion coatings are typically formed of aluminide-type alloys, such as nickel-aluminide; a noble metal-aluminide such as platinum-aluminide; or nickel-platinum-aluminide. Overlay coatings typically have the composition MCrAl(X), where M is an element selected from the group consisting of Ni, Co, Fe, and combinations thereof, and X is an element selected from the group consisting of Y, Ta, Si, Hf, Ti, Zr, B, C, and combinations thereof. Diffusion coatings are formed by depositing constituent components of the coating, and reacting those components with elements from the underlying substrate, to form the coating by high temperature diffusion. In contrast, overlay coatings are generally deposited intact, without reaction with the underlying substrate.

During service, diffusion and overlay coatings are often exposed to oxidative conditions. For example, coatings on turbine airfoils are typically subjected to oxidation in the hot gas path during normal operation. Under such conditions, with temperatures in the range of about 525-1150° C., various oxidative products are formed on the coatings. For example, aluminum oxides and other metal oxides, including nickel oxide, cobalt oxide, chromium oxide, and other base metal oxides, often form on simple aluminide and platinum-aluminide coatings. Aluminum oxides, chromium oxides, and various spinels often form on the MCrAl(X)-type coatings.

When turbine engine components are overhauled, the protective coatings are often removed to allow inspection and repair of the underlying substrate. Various stripping compositions have been used to remove the coatings. Usually, the oxide materials must be removed before the coatings can be treated with the stripping composition. Various techniques have been used for oxide removal. For example, oxide materials often have been removed from external sections of turbine components by grit blasting.

Alternatively, turbine components have sometimes been treated in an oxide-removal solution comprising a strong mineral acid or a strong caustic. Examples of such mineral acids are hydrochloric acid, sulfuric acid, and nitric acid. The caustic solutions usually include sodium hydroxide, potassium hydroxide, or various molten salts. Repeated treatments sometimes are used to remove the oxide. After removal of the oxide is completed, the substrate is then typically immersed in another solution suitable for removing the coating material itself. In current practice, the aluminide materials are often stripped from the substrate by exposure to various acids or combinations of acids, e.g., hydrochloric acid, nitric acid, and phosphoric acid.

There are some drawbacks associated with the use of the various stripping compositions mentioned above. Some stripping compositions do not remove sufficient amounts of the aluminide material. Other compositions that remove the aluminides also attack the base metal of the substrate, pitting the base metal or damaging the metal via intergranular or interdendritic (in the case of single crystal materials) attack. Some stripping compositions are used at elevated temperatures, e.g., above about 75° C. to speed the reaction and removal of the coating. Operation at these temperatures can promote increased attack of the base metal and may require masking materials to protect selected portions of the metal part, e.g., airfoil internal surfaces. Elevated temperature processes also increase energy costs and potentially require additional safety precautions. Airfoil internal surfaces are often filled with wax or plastic to protect surfaces that do not require stripping. These materials must be removed before using the part, adding additional manufacturing steps and cost. Moreover, conventional treatment solutions that employ large quantities of strong mineral acids may emit an excessive amount of hazardous fumes that must be scrubbed from ventilation exhaust systems.

Some processes use grit-blasting prior to acid treatment to pretreat and activate the substrate surface, and after exposure to the stripping composition to remove residual degraded coating. These steps can be very time-consuming, and can also damage the substrate and limit part life. Special care may need to be taken to prevent grit-blasting damage to the substrate or any protective coating not being removed from the metal part. Moreover, grit-blasting cannot generally be used to remove oxide material from internal passages or cavities in metal parts. For example, grit-blasting would not be suitable for use in the internal cooling passages of high pressure turbine blades where the grit particles could block the internal passages.

It is thus apparent that new processes for removing aluminide coatings from metal substrates would be welcome in the art. It would be desirable if the processes remove substantially all of the aluminide coating, while not damaging the base metal. Moreover, it would be desirable if the processes could be carried out at lower temperatures to minimize or eliminate base metal attack. It would also be desirable if the processes eliminate preliminary steps like grit-blasting, so that they can be used to effectively remove coatings from internal sections of metal parts without blocking internal passages.

BRIEF DESCRIPTION OF THE INVENTION

In one aspect, this invention relates to a method for selectively removing an aluminide coating from at least one surface of a metal-based substrate, comprising the following steps:
(a) contacting the surface of the substrate with at least one stripping composition comprising from about 20% to about 40% nitric acid, by weight of the composition, at a temperature less than about 20° C. for at least about 2 hours to degrade the coating without damaging the substrate; and
(b) removing the degraded coating without damaging the substrate.

As used herein, "selective removal" of the aluminide coating refers to the removal of a relatively large percentage of the aluminide material while removing only a very small portion (or none) of the substrate material. Any affected portion of the metal substrate is usually to a depth of less than about 0.0015 inches (about 38 microns), typically less than about 0.001 inches (about 25 microns), and more typically less than about 0.0005 inches (about 13 microns).

The term "aluminide material" in this context is meant to include a variety of materials typically used in coating metal alloys (especially superalloys), or which are formed during or after the coating process. Non-limiting examples include simple aluminide, platinum-modified aluminide, nickel aluminide, cobalt aluminide, platinum-nickel aluminide, refractory-doped aluminide, or alloys comprising one or more of those compounds.

In another aspect, this invention relates to a method for selectively removing an aluminide coating from at least one internal surface of a metal-based substrate, comprising the following steps:
(a) contacting the surface of the substrate with an aqueous solution comprising from about 10% to about 50%, by weight of the solution, of caustic at a temperature of from about 60° C. to about 100° C. for from about 1 to about 4 hours;
(b) contacting the surface of the substrate with at least one stripping composition comprising from about 20% to about 40% nitric acid, by weight of the composition, at a temperature less than about 20° C. for at least about 2 hours to degrade the coating without damaging the substrate;
(c) contacting the surface of the substrate with an aqueous solution comprising from about 10% to about 50%, by weight of the solution, of caustic at a temperature of from about 60° C. to about 100° C. for from about 20 minutes to about 2 hours;
(d) contacting the surface of the substrate with at least one stripping composition comprising from about 20% to about 40% nitric acid, by weight of the composition, at a temperature less than about 20° C. for at least about 2 hours to degrade the coating without damaging the substrate; and
(e) contacting the surface of the substrate with an aqueous solution comprising from about 10% to about 50%, by weight of the solution, of caustic at a temperature of from about 60° C. to about 100° C. for from about 1 to about 4 hours to remove the degraded coating without damaging the substrate.

In another aspect, the invention relates to a turbine engine part having a metal-based substrate and an aluminide coating on at least one surface thereof, at least a portion of which coating has been selectively removed from the surface of the substrate using the above methods.

Another aspect of the invention relates to a method for selectively removing an aluminide coating from at least one internal surface of a superalloy substrate, comprising the following steps:
(a) contacting the surface of the substrate with at least one stripping composition comprising from about 25% to about 35% nitric acid, by weight of the composition, at a temperature of from about 0° C. to about 15° C. for from about 4 hours to about 10 hours to degrade the coating without damaging the substrate; and
(b) removing the degraded coating without damaging the substrate.

In yet another aspect, the invention relates to a method for replacing a worn or damaged aluminide coating on at least one surface of a metal-based substrate, comprising the steps of selectively removing the aluminide coating from the surface using the above methods, and then applying a new aluminide coating to the surface of the substrate.

Other details regarding the various embodiments of this invention are provided below.

DETAILED DESCRIPTION OF THE INVENTION

The above methods comprise the step of contacting the surface of the substrate with at least one stripping composition comprising from about 20% to about 40% nitric acid, by weight of the composition, at a temperature less than about 20° C. for at least about 2 hours to degrade the coating without damaging the substrate.

Within the above ranges, various stripping compositions and processing conditions can be used in the process of the invention. The choice of a particular composition or condition will depend on various factors, such as the type of substrate, the type of aluminide coating being removed from the substrate, the intended end use for the substrate, and the presence or absence of additional treatment steps (e.g., pretreatment, desmutting, neutralization and/or rinsing steps). Those skilled in the art will be able to choose appropriate stripping compositions and processing conditions for a given situation, based on the teachings herein.

The substrate of the present invention can be any metallic material or alloy typically protected by an aluminide coating. As used herein, "metallic" refers to substrates that are primarily formed of metal or metal alloys, but which may also include some non-metallic components. Non-limiting examples of metallic materials comprise at least one element selected from the group consisting of iron, cobalt, nickel, aluminum, chromium, titanium, and mixtures thereof (e.g., stainless steel).

Often, the substrate is a heat-resistant alloy, e.g., a nickel-based material or cobalt-based material. Such materials are described in various references, including U.S. Pat. Nos. 5,399,313 and 4,116,723. The type of substrate can vary widely, but it is often in the form of a jet engine part, such as an airfoil component. As another example, the substrate may be the piston head of a diesel engine, or any other substrate requiring a heat-resistant or oxidation-resistant coating. The substrate may also be in the form of a houseware item (e.g., cookware), or other industrial hardware or equipment.

The metallic material is often a superalloy, typically nickel-, cobalt-, or iron-based, although nickel- and cobalt-based alloys are favored for high-performance applications. The base element, typically nickel or cobalt, is the single greatest element in the superalloy by weight. Nickel-based superalloys usually include at least about 40% Ni, and at least one component selected from the group consisting of cobalt, chromium, aluminum, tungsten, molybdenum, titanium, and iron. Examples of nickel-base superalloys are designed by the trade names Inconel®, Nimonic®, and René®, and include directionally solidified and single crystal superalloys. Cobalt-based superalloys usually include at least about 30% Co, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®.

The aluminide coating on the substrate may be applied in a variety of locations on a component. In the case of a turbine engine, the coating is often applied on combustor liners, combustor domes, shrouds, airfoils, including buckets or blades, nozzles, and vanes. The coating can be found on the flat areas of substrates, as well as on curved or irregular surfaces. The coating may also be formed on the surfaces of internal cavities in the substrates, e.g., indentations, hollow regions, or holes. For example, the cavities can be in the form of radial cooling holes or serpentine passageways, which can have an overall length of up to about 30 inches (about 76.2 cm) in turbine engine airfoils. It is often difficult to remove the coating from the surface of these cavities by conventional, line-of-sight processes such as grit blasting, plasma etching, or laser ablation.

The thickness of the coating will depend on a variety of factors. These include the length of service time for the component, its thermal history, and the particular composition of the coating and substrate. Usually the coating has a thickness in the range of from a few microns to about 150 microns, and most often in the range of from about 25 microns to about 75 microns.

The stripping composition of the present invention comprises from about 20% to about 40%, typically from about 25% to about 35%, more typically from about 28% to about 32%, by weight of the composition, of nitric acid. This relatively high concentration of nitric acid often causes less base metal attack than lower concentrations of nitric acid. The balance of the stripping composition typically is a suitable solvent, such as water, although minor amounts of other acids and additives as described below may be included in the composition. Inorganic acids, such as hydrochloric acid and sulfuric acids, and aliphatic and aromatic acids useful herein are disclosed in U.S. Pat. No. 5,976,265, Sangeeta et al.

The stripping composition of the present invention may include various other additives that serve a variety of functions. Non-limiting examples of these additives are solvents, inhibitors, dispersants, surfactants, chelating agents, wetting agents, deflocculants, stabilizers, anti-settling agents, oxidizing agents, reducing agents, and antifoam agents. Those of ordinary skill in the art are familiar with such additives, and with effective levels for their use.

In certain embodiments, an organic solvent may be used to reduce the activity and increase the wetting capability of the nitric acid relative to the substrate. (The chemical interaction between an acid and a hydrocarbon solvent will often differ from the interaction between the acid and a solvent like water.) The combination of nitric acid and the organic solvent may remove substantially all of the aluminide coating material without adversely affecting the substrate. As used herein, "activity" generally refers to a measurement of the reactivity of the acid toward the substrate and/or the aluminide coating being removed from the substrate.

Examples of organic solvents which generally meet the requirements for this class of stripping compositions are aliphatic alcohols, aromatic alcohols, chlorinated alcohols, ketones, nitrile-based solvents, nitrated hydrocarbon solvents, nitrated aromatic solvents such as nitrobenzene, chlorinated hydrocarbons, amines, and mixtures of any of the foregoing. Specific examples of aliphatic alcohols useful herein are methanol, ethanol, and isopropanol. Mixtures of alcohols may be used as well. Specific examples of aromatic alcohols are phenols and substituted phenols.

The use of such mixtures may occasionally result in slight pitting, or in a small amount of corrosion of the substrate, which is typically substantially uniform. As used herein, "uniform corrosion" refers to the removal of a very thin, continuous layer of the substrate, usually less than about 2 microns in thickness. Uniform corrosion and slight pitting are not a significant drawback for some end uses of the substrate. This is in contrast to the occurrence of severe "pitting", which results in holes in the substrate, often to a depth of at least about 25 microns, and usually to a depth in the range of from about 25 microns to about 500 microns.

In some embodiments, the stripping composition further includes a wetting agent. The wetting agent reduces the surface tension of the composition, permitting better contact with the substrate and the aluminide coating, particularly on internal surfaces of metal parts, to improve stripping of the aluminide coating. Suitable wetting agents include polyalkylene glycols, glycerol, fatty acids, soaps, emulsifiers, and surfactants. The wetting agent is usually present at a level in the range of from about 0.1% by weight to about 5% by weight, based on the total weight of the composition.

Inhibitors such as acetic acid are sometimes employed in the stripping composition to lower the activity of the acid in the composition. The lowered activity in turn decreases the potential for pitting of the substrate surface. If used, the level of inhibitor usually is from about 1% by weight to about 15% by weight, based on the weight of the stripping composition.

Oxidizing agents are sometimes used in the stripping composition to prevent the formation of a reducing environment. Examples include peroxides (e.g., hydrogen peroxide), chlorates, perchlorates, nitrates, permanganates, chromates, and osmates (e.g., osmium tetroxide). The level of oxidizing agent used is usually from about 0.01% by weight to about 5% by weight, based on the weight of the entire stripping composition.

The stripping composition may be applied to the substrate in a variety of ways. In some embodiments, the substrate is immersed, either partially or fully, in a bath of the composition. Immersion in this manner (in any type of vessel) often permits the greatest degree of contact between the composition and the coating being removed. The substrate may be lowered into the bath using a suitable rack (for example, one having a polypropylene or other non-conductive surface) that can be raised to remove the substrate after the desired immersion time is reached. Immersion time and bath temperature will depend on many of the factors described above, such as the type of coating being removed and the acid (or acids) being used in the bath. However, the bath is typically maintained at a temperature below about 20° C. while the substrate is immersed therein. In some embodiments, the bath is maintained at a temperature of from about 0° C. to about 15° C., often from about 4° C. to about 12° C. Temperatures much higher than 20° C. typically result in more rapid removal of the aluminide coating and may cause excessive pitting of the base metal. Use of the lower temperatures herein protects the metal substrate and masking materials that may be present, and also reduces safety hazards associated with higher-temperature baths when volatile components are present.

Baths comprising the stripping composition are often stirred or otherwise agitated while the process is carried out, to permit maximum contact between the stripping agent and the coating being removed. A variety of known techniques can be used for this purpose, such as using impellers, ultrasonic agitation, magnetic agitation, gas bubbling, or circulation-pumps. Immersion time in the bath will vary based on many of the factors discussed above. On a commercial scale, the immersion time will usually range from about 2 hours to about 20 hours in total, which may be split among two or more stripping steps. In some embodiments, the total immersion time will be from about 3 to about 15 hours, typically from about 4 to about 10 hours, more typically from about 6 to about 8 hours. Longer stripping times within the above ranges promote more complete removal of the aluminide coating but can cause greater base metal attack. Thus, the stripping time, the concentration of nitric acid in the stripping composition, and the temperature of the stripping composition are selected to provide the desired balance between maximizing removal of the aluminide coating and minimizing base metal attack for a particular coating and metal substrate.

Exposure to the stripping composition causes the aluminide coating on the surface of the substrate to become degraded. For example, the coating may have deep cracks, its integrity may be diminished, and its adhesion to the substrate may be substantially decreased. In some embodiments, the surface may be rinsed by contact with or immersion in water or an aqueous solution for a short time, e.g., less than about 1 minute, to remove the stripping composition and/or degraded coating from the surface.

Removal of the degraded coating without damaging the substrate may be accomplished by various other methods known in the art. For example, the degraded coating may be removed by abrading the substrate surface, such as by using a gentle abrasion step that minimizes damage to the substrate. As an example, light grit-blasting can be carried out by directing a pressurized air stream comprising aluminum oxide particles across the surface at a pressure of less than about 40 psi (about 2.8 kgf/cm$^2$), typically less than about 20 psi (about 1.4 kgf/cm$^2$). Various abrasive particles may be used for the grit-blasting, e.g., metal oxide particles such as alumina, as well as silicon carbide, glass beads, crushed glass, sodium carbonate, and crushed corn cob. The average particle size usually is less than about 500 microns, and typically less than about 100 microns.

The grit-blasting is carried out for a time period sufficient to remove the degraded coating. The duration of grit-blasting in this embodiment will depend on various factors. In the case of an aluminide coating having a thickness of from about 50 microns to about 100 microns, grit-blasting will usually be carried out for from about 60 seconds to about 120 seconds, when utilizing an air pressure of from about 20 psi (about 1.4 kgf/cm$^2$) to about 30 psi (about 2.1 kgf/cm$^2$) and grit particles having an average particle size of less than about 100 microns.

Other known techniques for lightly abrading the surface may be used in lieu of grit-blasting. For example, the surface may be manually scrubbed with a fiber pad, e.g., a pad with polymeric, metallic or ceramic fibers. Alternatively, the surface may be polished with a flexible wheel or belt in which alumina or silicon carbide particles have been embedded. Liquid abrasive materials may be used on the wheels or belts. For example, they may be sprayed onto a wheel in a vapor honing process. These alternative techniques can be controlled to maintain a contact force against the substrate surface that is no greater than the force used in the gentle grit-blasting technique discussed above.

Other techniques may be employed to remove the degraded material. One example is laser ablation of the surface. Alternatively, the degraded material may be scraped off the surface. In another embodiment, sound waves (e.g., ultrasonic waves), which may originate from an ultrasonic horn, can be directed against the surface to cause vibrations that can shake loose the degraded material.

In some instances, the degraded coating may be removed by a more aggressive agitation, e.g., agitation with a force greater than that produced using the ultrasonic technique itself. For example, the substrate can be immersed in a bath that is rapidly stirred with a mechanical stirrer (i.e., for "general agitation"), and that is also ultrasonically-stirred (i.e., for "local agitation"). Agitation can be carried out until the degraded material is shaken loose. For each of these alternative techniques, those skilled in the art would be familiar with operating adjustments that can be made to control the relevant force applied to the substrate to minimize damage to the substrate surface.

In some embodiments, an extended rinsing step may be used to remove the degraded coating without damaging the substrate. This may involve contacting the degraded aluminide coating with an aqueous solution comprising a wetting agent like those described previously, for example, a polyalkylene glycol such as polyethylene glycol. The wetting agent is usually present at a level of from about 0.1% to about 5% by weight, based on the total weight of the rinsing solution. Rinsing can be carried out by a variety of techniques, but is usually undertaken by immersing the substrate in an agitated bath of the rinsing solution for a time period from about 1 minute to about 30 minutes. The extended rinsing step can remove chunks of aluminide particles and oxides from the substrate. Any remaining thin layer of more coherent aluminide material may be removed in another agitation step, or by again contacting the substrate with the stripping composition.

In other embodiments, the degraded coating may be removed by including the step of contacting the degraded coating with a caustic material. The caustic may also clean the surface, remove any surface oxides formed as a result of the stripping step, and activate the surface for any additional processing steps, such as a second stripping step. Examples of caustics include potassium hydroxide (KOH), sodium hydroxide (NaOH), ammonium hydroxide (NH$_4$OH), lithium hydroxide (LiOH), triethylamine (($C_2H_5$)$_3$N; TEA), tetramethylammonium hydroxide (($CH_3$)$_4$NOH; TMAH), and mixtures thereof. The contact time can range from about 20 minutes to about 4 hours, although longer or shorter times may be selected depending on the properties of the particular caustic, coating and base metal.

The caustic may be in the form of a molten salt, but usually is present as an aqueous solution comprising from about 10% to about 50%, typically from about 15% to about 30%, more typically from about 17% to about 25%, of caustic, by weight of the composition. The caustic solution usually has a temperature of from about 60° C. to about 100° C., typically from about 65° C. to about 90° C., more typically from about 70° C. to about 85° C.

The caustic solution may be applied to the substrate in a variety of ways, but as described above, the substrate is typically immersed in a bath of the caustic solution. In one embodiment, the substrate is lowered into the bath using a suitable rack (for example, one having a polypropylene or other non-conductive surface) that can be raised to remove the substrate after the desired immersion time is reached. The caustic solution is typically agitated while in contact with the substrate. In one embodiment, this is ultrasonic agitation. Alternatively, a more aggressive agitation, such as described above, may be used.

A caustic solution such as described above may also be used to pretreat, clean, or remove oxides from the metal-based substrate prior to contact with the stripping composition. In one embodiment, the caustic solution is used to clean or remove oxides from the substrate prior to and after each contact with a stripping composition. A rinsing step is typically provided between the caustic and acid bath treatments herein to prevent potentially violent reactions between the caustic and acid solutions.

After removal of the coating from the substrate, compressed air may be blown across the substrate to remove any residual aluminide particles, oxides, or abrasive particles. If desired, the substrate can then be re-coated with any suitable material. For example, platinum-aluminide protective coatings for engine parts can again be applied to the surface of a superalloy substrate.

In some embodiments of the invention, the substrate surface may be contacted with two (or more) stripping compositions, in sequence. The first composition may quickly remove some of the aluminide coating. The second (or subsequent) stripping composition may then remove the remaining aluminide coating more slowly, with little or no pitting or attack on the substrate except for the possible occurrence of uniform corrosion, as discussed previously.

Typically, each stripping composition is present in the form of a bath in which the substrate is immersed. Contact times and bath temperatures may vary, as described previously. In one embodiment, the substrate is immersed in a first bath maintained at a temperature in the range of from about 4° C. to about 12° C., with an immersion time between about 3 and about 4 hours. After rinsing and contact with a caustic solution as described above, the substrate is then immersed in a second bath, typically also maintained at a temperature in the range of from about 4° C. to about 12° C., with an immersion time between about 3 and about 4 hours. Additional stripping steps may be used, but are often unnecessary. As described above, the substrate can then be subjected to various steps to remove the degraded coating.

In another embodiment, the invention comprises a method for selectively removing an aluminide coating from at least one internal surface of a metal-based substrate, comprising the following steps:

(a) contacting the surface of the substrate with an aqueous solution comprising from about 10% to about 50%, by weight of the solution, of caustic at a temperature of from about 60° C. to about 100° C. for from about 1 to about 4 hours;

(b) contacting the surface of the substrate with at least one stripping composition comprising from about 20% to about 40% nitric acid, by weight of the composition, at a temperature less than about 20° C. for at least about 2 hours to degrade the coating without damaging the substrate;

(c) contacting the surface of the substrate with an aqueous solution comprising from about 10% to about 50%, by weight of the solution, of caustic at a temperature of from about 60° C. to about 100° C. for from about 20 minutes to about 2 hours;

(d) contacting the surface of the substrate with at least one stripping composition comprising from about 20% to about 40% nitric acid, by weight of the composition, at a temperature less than about 20° C. for at least about 2 hours to degrade the coating without damaging the substrate; and (e) contacting the surface of the substrate with an aqueous solution comprising from about 10% to about 50%, by weight of the solution, of caustic at a temperature of from about 60° C. to about 100° C. for from about 1 to about 4 hours to remove the degraded coating without damaging the substrate.

In one embodiment, the caustic solution is ultrasonically agitated while in contact with the substrate. The caustic solution typically comprises from about 15% to about 30%, more typically from about 17% to about 25%, by weight of the composition, of caustic, such as potassium hydroxide. The temperature of the caustic solution is usually from about 65° C. to about 90° C., typically from about 70° C. to about 85° C. In one embodiment, the caustic solution contacts the substrate for a time ranging from about 1.5 to about 2.5 hours in each of steps (a) and (e), and from about 20 minutes to about 1 hour, typically from about 25 to about 35 minutes, in step (c).

In another embodiment, the method of the invention is used to selectively remove the aluminide coating from the internal shank and root surfaces of a high-pressure turbine blade. The shank portion of the turbine blade typically is a high stress region whose surfaces often operate below the ductile-to-brittle transition temperature of the aluminide coating. This makes the aluminide coating more susceptible to the formation of minute cracks in the coating that can spread to the substrate and lead to a metal fatigue and blade failure. In one aspect of the invention, the aluminide coating is completely removed from the internal shank surfaces, but not removed from the airfoil internal and external surfaces where the protective coating is desired. This can be achieved by immersing the turbine blade in the stripping composition only up to the desired level of the shank portion of the blade. This avoids the need for masking the airfoil portions of the blade where the aluminide coating is desired. Since the stripping composition is used at relatively low temperatures, unlike mixtures of hydrochloric acid and nitric acid which are typically heated to increase the stripping rate, acid fumes are not produced that can attack unmasked areas of the airfoil internal and external surfaces.

In another aspect, the invention relates to a turbine engine part having a metal-based substrate and an aluminide coating on at least one surface thereof, at least a portion of which coating has been selectively removed from at least one surface of the substrate by a method comprising the following steps:

(a) contacting the surface of the substrate with at least one stripping composition comprising from about 20% to about 40% nitric acid, by weight of the composition, at a temperature less than about 20° C. for at least about 2 hours to degrade the coating without damaging the substrate; and (b) removing the degraded coating without damaging the substrate.

In some embodiments, at least a portion of the aluminide coating has been selectively removed from at least one surface of the substrate by using the above method and selecting various stripping compositions, caustics and processing conditions as described above.

Another aspect of the present invention is directed to a method for replacing a worn or damaged aluminide coating on at least one surface of a metal-based substrate, comprising the following steps:

(i) selectively removing the aluminide coating from the surface of the substrate by (a) contacting the surface of the substrate with at least one stripping composition comprising from about 20% to about 40% nitric acid, by weight of the composition, at a temperature less than about 20° C. for at least about 2 hours to degrade the coating without damaging the substrate; and (b) removing the degraded coating without damaging the substrate; and (ii) applying a new aluminide coating to the surface of the substrate.

Techniques for applying the new aluminide coating are known in the art. For example, various thermal spray techniques can be employed for the deposition of overlay coatings. Examples include vacuum plasma spray (VPS), air plasma spray (APS), and high velocity oxy-fuel (HVOF). Other deposition techniques can be used as well, such as sputtering and physical vapor deposition (PVD), e.g., electron beam physical vapor deposition (EB-PVD).

Various techniques are also known for applying diffusion coatings, e.g., noble metal-aluminide coatings such as platinum-aluminide or palladium-aluminide. As an example in the case of platinum-aluminide, platinum can initially be electroplated onto the substrate, using P-salt, Q-salt, or other suitable platinum electroplating solutions. In a second step, the platinum layer is diffusion-treated with aluminum vapor to form the platinum-aluminide coating.

The following examples illustrate some embodiments of this invention, but should not be construed to be any sort of limitation on its scope. In the examples, each test sample was a high-pressure turbine blade that had been used for some time in a commercial gas turbine engine. The turbine blades were made from a single crystal nickel-based superalloy, designated by the trade name René® N5. The turbine blades were coated externally with a platinum-aluminide bond coating and an EB-PVD yttria-stabilized zirconia thermal barrier top coat. The internal surfaces of the turbine blades were coated with a simple aluminide coating.

EXAMPLE 1

A sample blade was treated according to a process involving multiple steps. First, the thermal barrier coating was aggressively removed by grit blasting with aluminum oxide. The blade was then injected with the commercial acid resistant Plastisol® resin to protect the cooling holes and internal passages from the chemical stripping solution. The blade was then immersed in a bath formed from a 50:50 (by weight) mixture of nitric acid and phosphoric acid. The bath was maintained at a temperature of about 170-190° F. (about 77-88° C.). After about 2 to 4 hours, the blade was removed and rinsed in cold tap water. The Plastisol® resin was removed from the internal surfaces by exposing the blade to a temperature of about 1100° F. (about 593° C.) for 1 hour in an air furnace. The external surface of the blade was then lightly grit blasted with 220-mesh aluminum oxide particles at a pressure of about 20-30 psi (about 1.4-2.1 kgf/cm$^2$). The above process removed the aluminide coating from the external surfaces of the blade, but not from the internal surfaces.

EXAMPLE 2

A sample blade was treated using a process of the invention to remove the aluminide coating from a portion of its internal surfaces without damaging the external platinum-aluminide bond coat. The process involved pre-treating and activating the surface to be stripped, followed by immersion of the part in a cold nitric acid solution to degrade the coating, and then immersion in hot potassium hydroxide solution to remove the degraded coating. First, the root plate from the trailing edge cooling circuit of the blade was removed by grinding to provide better access to the internal cooling passages of the blade. The blade surfaces were then pre-treated and activated by immersion in an aqueous bath comprising about 15% to 25% KOH (by weight) maintained at 160-180° F. (about 71-82° C.) for 2 hours with ultrasonic agitation. After rinsing in de-ionized water, the blade root and shank were immersed in a solution comprising 30% (by weight) nitric acid and about 0.3% (by weight) Activol® 1658 wetting agent, maintained at 45-55° F. (about 7-13° C.), for 3.5 hours to degrade the coating without damaging the substrate. After rinsing in de-ionized water, the blade was returned to the KOH bath for an additional 25-35 minutes, with ultrasonic agitation to remove the degraded coating and re-activate the surface. The blade root and shank were again immersed in the cold nitric acid solution for 3.5 hours to degrade the remaining coating without damaging the substrate. After rinsing in de-ionized water, the blade was returned to the KOH bath for 2 hours with ultrasonic agitation to remove the degraded coating.

The above process completely removed the aluminide coating from the internal and external surfaces of the root and shank portions of the blade with negligible effect on the base metal and on the aluminide coating on the internal and external surfaces of the airfoil portion of the blade. In contrast to Example 1, the process avoided the need for masking the internal cavities of the blade to prevent them from being blocked by grit particles, and also avoided the use of a high-temperature stripping step that can attack the base metal and generate acid fumes. The process sequence of alternating cycles of exposure to hot KOH, rinse, cold nitric acid, rinse, and hot KOH can be repeated a number of times to ensure complete removal of the aluminide coating from the root and shank portions of the blade.

EXAMPLE 3

A sample blade was treated using another process of the invention to remove the aluminide coating from a portion of its internal surfaces without damaging the external platinum-aluminide bond coat. The process involved immersion of the part in a cold nitric acid solution to degrade the coating and then immersion in hot potassium hydroxide solution to remove the degraded coating. First, the root plate from the trailing edge cooling circuit of the blade was removed by grinding to provide better access to the internal cooling passages of the blade. The blade root and shank were immersed in a solution comprising 30% nitric acid (by weight) and about 0.3% (by weight) Activol® 1658 wetting agent, maintained at 35-40° F. (about 2-4° C.), for 5 hours to degrade the coating without damaging the substrate. After rinsing in tap water, the blade was immersed in an aqueous solution comprising about 15% to 25% KOH (by weight) maintained at 160-180° F. (about 71-82° C.) for 2 hours with ultrasonic agitation to remove the degraded coating.

The above process also completely removed the aluminide coating from the internal and external surfaces of the root and shank portions of the blade, with negligible effect on the base metal and on the aluminide coating on the internal and external surfaces of the airfoil portion of the blade. These results were obtained even though the process did not use the KOH pretreatment step used in Example 2, and the nitric acid solution was maintained at a lower temperature.

Various embodiments of this invention have been described. However, this disclosure should not be deemed to be a limitation on the scope of the invention. Accordingly, various modifications, adaptations, and alternatives may occur to one skilled in the art without departing from the spirit and scope of the claimed invention.

What is claimed:

1. A used turbine engine blade having a metal-based substrate and an aluminide coating on at least one internal surface of the airfoil portion of the blade and at least one external surface of the airfoil portion of the blade, and wherein at least a portion of an aluminide coating has been selectively removed from at least one internal surface of the root and shank portions of the blade with negligible effect on the aluminide coating on the internal and external surfaces of the airfoil portion of the blade by a method comprising the following steps:
   (a) contacting the at least one internal surface of the root and shank portions of the blade with at least one stripping composition comprising from about 20% to about 40% nitric acid, by weight of the composition, at a temperature less than about 20° C. for at least about 2 hours to degrade the coating without damaging the substrate; and
   (b) removing the degraded coating without damaging the substrate.

2. The turbine engine part of claim 1, wherein the aluminide coating comprises at least one compound selected from the group consisting of aluminide, platinum aluminide, nickel aluminide, platinum-nickel aluminide, refractory-doped aluminides, and alloys comprising at least one of the foregoing.

3. The turbine engine part of claim 2, wherein the metal-based substrate is a nickel-based superalloy or a cobalt-based superalloy.

4. A used turbine engine blade having a metal-based substrate and an aluminide coating on at least one internal surface of the airfoil portion of the blade and at least one external surface of the airfoil portion of the blade, and wherein at least a portion of an aluminide coating has been selectively removed from at least one internal surface of the root and shank portions of the blade with negligible effect on the aluminide coating on the internal and external surfaces of the airfoil portion of the blade by a method comprising the following steps in sequence:
   (a) contacting the at least one internal surface of the root and shank portions of the blade with an aqueous solution comprising from about 10% to about 50%, by weight of the solution, of caustic at a temperature of from about 60° C. to about 100° C. for from about 20 minutes to about 4 hours;
   (b) contacting the at least one internal surface of the root and shank portions of the blade with at least one stripping composition comprising from about 20% to about 40% nitric acid, by weight of the composition, at a temperature less than about 20° C. for at least about 2 hours to degrade the coating without damaging the substrate; and
   (c) removing the degraded coating without damaging the substrate.

5. The turbine engine part of claim 4, wherein the stripping composition comprises from about 25% to about 35% nitric acid, by weight of the composition.

6. The turbine engine part of claim 4, wherein the stripping composition has a temperature of from about 0° C. to about 15° C.

7. The turbine engine part of claim 4, wherein the stripping composition contacts the substrate for a period of from about 4 hours to about 10 hours.

8. The turbine engine part of claim 4, wherein the stripping composition contacts the substrate for a period of from about 6 hours to about 8 hours.

9. The turbine engine part of claim 4, wherein the stripping composition comprises from about 25% to about 35% nitric acid, by weight of the composition, and has a temperature of from about 4° C. to about 12° C.

10. The turbine engine part of claim 4, wherein the stripping composition further comprises from about 0.1% to about 5%, by weight of the composition, of a wetting agent.

11. The turbine engine part of claim 4, wherein the stripping composition further comprises from about 0.1% to about 5%, by weight of the composition, of a wetting agent selected from the group consisting of polyalkylene glycols, glycerol, fatty acids, soaps, emulsifiers, and surfactants.

12. The turbine engine part of claim 11, wherein the root and shank portions of the blade are immersed in a bath of the stripping composition in step (b) for a period of from about 6 hours to about 8 hours.

13. The turbine engine part of claim 4, wherein the root and shank portions of the blade are immersed in a bath of the stripping composition in step (b).

14. The turbine engine part of claim 13, wherein the bath is maintained at a temperature of from about 0° C. to about 15° C. while the root and shank portions of the blade are immersed therein for a period of from about 4 hours to about 10 hours.

15. A turbine engine blade used in service in a commercial gas turbine engine and having a metal-based substrate and an aluminide coating on at least one internal surface of the airfoil portion of the blade and on at least one external surface of the airfoil portion of the blade, in which a worn or damaged aluminide coating on at least one internal surface of the root and shank portions of the blade has been replaced by a method comprising the following steps in sequence:
   (i) selectively removing the aluminide coating from the at least one internal surface of the root and shank portions of the blade with negligible effect on the aluminide coating on the internal and external surfaces of the airfoil portion of the blade by (a) contacting the surface with an aqueous solution comprising from about 10% to about 50%, by weight of the solution, of caustic at a temperature of from about 60° C. to about 100° C. for from about 20 minutes to about 4 hours; (b) contacting the surface with at least one stripping composition comprising from about 20% to about 40% nitric acid, by weight of the composition, at a temperature of less than about 20° C. for at least about 2 hours to degrade the coating without damaging the substrate; and (c) removing the degraded coating without damaging the substrate; and
   (ii) applying a new aluminide coating to the at least one internal surface of the root and shank portions of the blade.

16. The turbine engine part of claim 15, wherein the stripping composition comprises from about 25% to about 35% nitric acid, by weight of the composition.

17. The turbine engine part of claim 15, wherein the stripping composition has a temperature of from about 0° C. to about 15° C.

18. The turbine engine part of claim 15, wherein the stripping composition contacts the surface for a period of from about 4 hours to about 10 hours.

19. The turbine engine part of claim 15, wherein the caustic solution comprises from about 15% to about 30%, by weight, of potassium hydroxide.

20. The turbine engine part of claim 19, wherein the stripping composition comprises from about 28% to about 32% nitric acid, and the root and shank portions of the blade are immersed in a bath of the stripping composition having a temperature of from about 4° C. to about 12° C. for from about 6 hours to about 8 hours.

\* \* \* \* \*